(12) United States Patent
Chud

(10) Patent No.: US 10,817,919 B1
(45) Date of Patent: Oct. 27, 2020

(54) PROVIDING ASYNCHRONOUS APPLICATION STORE EVENT NOTIFICATIONS

(71) Applicant: Amazon Technologies, Inc., Seattle, WA (US)

(72) Inventor: Andrew Christopher Chud, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 662 days.

(21) Appl. No.: 14/667,520

(22) Filed: Mar. 24, 2015

(51) Int. Cl.
   *G06Q 30/06* (2012.01)
   *H04L 29/08* (2006.01)
   *H04L 29/06* (2006.01)

(52) U.S. Cl.
   CPC ......... *G06Q 30/0601* (2013.01); *H04L 67/02* (2013.01); *H04L 67/42* (2013.01)

(58) Field of Classification Search
   None
   See application file for complete search history.

(56) References Cited

U.S. PATENT DOCUMENTS

| | | | | |
|---|---|---|---|---|
| 7,433,875 B2* | 10/2008 | Sinclair | ................ | G06F 16/958 |
| 7,797,306 B1* | 9/2010 | Pather | ................ | H04L 12/1859 |
| | | | | 707/714 |
| 8,275,672 B1* | 9/2012 | Nguyen | ............. | G06Q 30/0641 |
| | | | | 705/26.1 |
| 8,838,784 B1* | 9/2014 | Kalavade | ............. | H04W 12/02 |
| | | | | 709/224 |
| 2005/0076109 A1* | 4/2005 | Mathew | ................ | H04L 51/00 |
| | | | | 709/223 |
| 2006/0080394 A1* | 4/2006 | Goodman | ............. | H04L 63/101 |
| | | | | 709/206 |

(Continued)

OTHER PUBLICATIONS

Isikligil, Emre, Semih Samakay, and Deniz Kilinç. "A Prototype Framework for High Performance Push Notifications." International Journal of Computer Applications 166.10 (2017) (Year: 2017).*

(Continued)

*Primary Examiner* — Michelle T Kringen
(74) *Attorney, Agent, or Firm* — BakerHostetler

(57) ABSTRACT

Technologies are disclosed herein for providing asynchronous application store event notifications. An application developer registers with an application store to receive asynchronous push notifications for application store events of interest, such as events relating to in-application purchases, payment events, fulfillment events, application publishing events, or other types of events. When an event for which a notification is to be provided is detected, an application store event message is generated for the event and provided to a notification service. The notification service generates an application store event notification for the event on a topic defined in advance by the application developer. The application store event notification may then be delivered to an endpoint defined by the application developer, such as a hypertext transfer protocol (HTTP) endpoint. Alternately, the application store event notification may be placed on a queue defined by the application developer that is provided by a queue service.

18 Claims, 8 Drawing Sheets

(56) References Cited

U.S. PATENT DOCUMENTS

| | | | | |
|---|---|---|---|---|
| 2010/0174680 A1* | 7/2010 | Yamagishi | ............ | H04N 7/163 |
| | | | | 707/622 |
| 2011/0173681 A1* | 7/2011 | Qureshi | ............. | H04L 63/0823 |
| | | | | 726/4 |
| 2016/0239848 A1* | 8/2016 | Chang | ................. | G06Q 30/016 |
| 2017/0083866 A1* | 3/2017 | Shah | ..................... | G06Q 10/10 |

OTHER PUBLICATIONS

Web Article: "Receipt Verification Service" (RVS)(IAP v2.0) published by Amazon, 2015 [online][retrieved on Mar. 24, 2015] retrieved from: https://developer.amazon.com/public/apis/earn/in-app-purchasing/docs- ,v2/verifying-receipts-in-iap-2.0, 7 pps.

U.S. Appl. No. 13/172,323, filed Jun. 29, 2011, first named inventor: Jack.

U.S. Appl. No. 13/996,491, filed Aug. 14, 2013, first named inventor: Hynoski.

* cited by examiner

PROVIDING ASYNCHRONOUS APPLICATION STORE EVENT NOTIFICATIONS

BACKGROUND

Application stores (which are commonly referred to as "app stores") typically provide functionality for allowing customers to browse and obtain applications for free or for a fee. For example, and without limitation, an application store might enable a customer utilizing a smartphone or tablet computing device to browse and obtain various types of applications that are suitable for use on the customer's particular type of computing device. Applications available through an application store might be provided by the operator of the application store or by third-party application developers.

In order for third-party developers to obtain certain types of information from an application store, it is commonly necessary for computing systems operated by the third-party application developers to poll the application store. For example, in order to verify the validity of purchase receipts for in-application purchases made by application store customers, it is commonly necessary for computing systems operated by third-party developers to poll a receipt verification service provided by the application store. Polling application store systems in this manner, however, can result in delayed delivery of relevant data to the third-party developers. Polling of application store systems might also be performed unnecessarily in cases where updated data has not been generated since the last time the application store systems were polled.

The disclosure made herein is presented with respect to these and other considerations.

DETAILED DESCRIPTION

Figure 1:
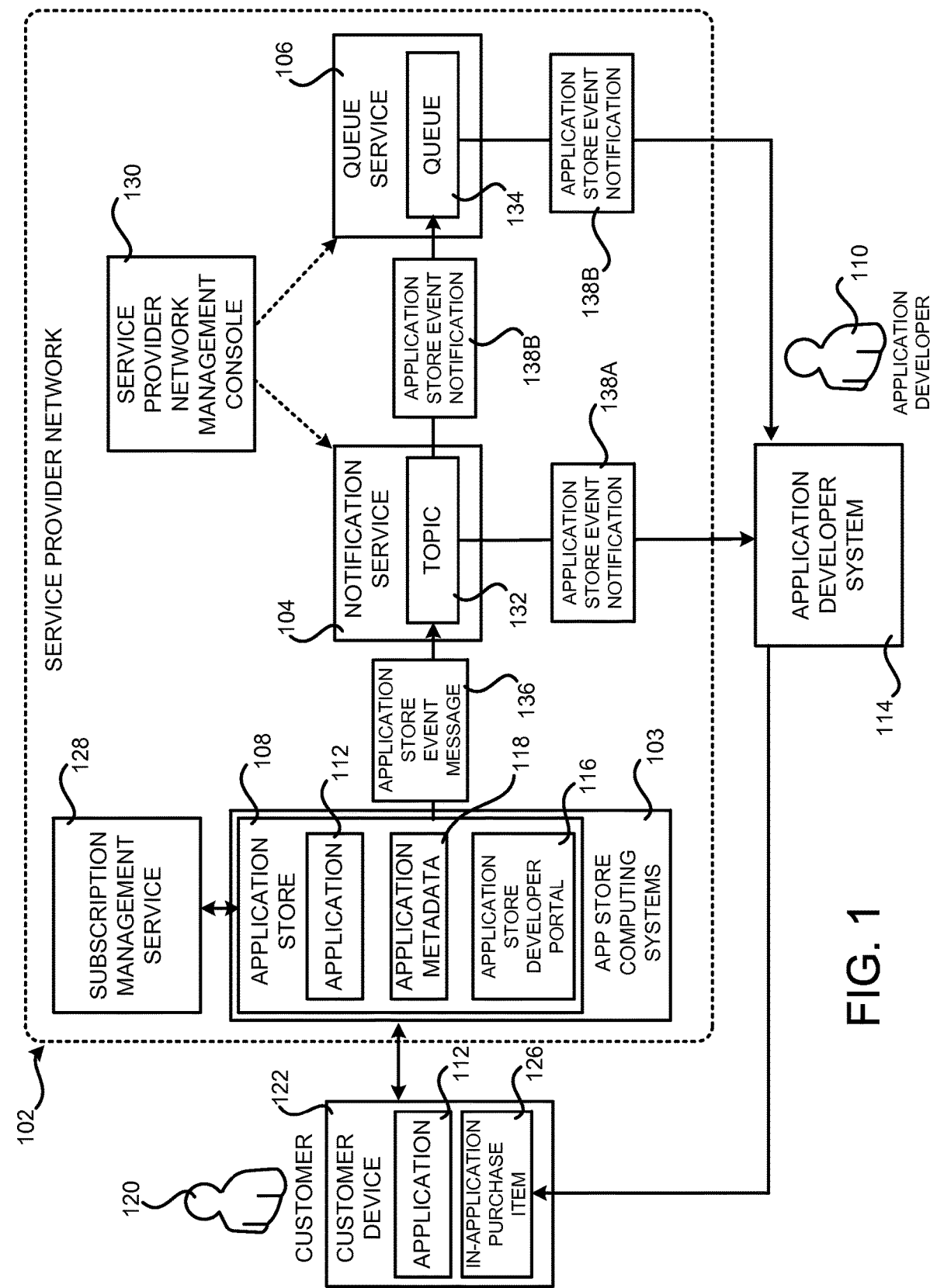
FIG. 1 is a system architecture diagram showing aspects of the configuration and operation of several components described herein for providing asynchronous application store event notifications.

The following detailed description is directed to technologies for providing asynchronous notifications of application store events. Utilizing an implementation of the technologies described herein, asynchronous push notifications indicating the occurrence of events associated with an application store can be provided to third-party developer computing systems in real or near-real time and without polling of application store systems. In this way, push notifications describing events of interest occurring at an application store can be provided to third-party developer computing systems in a more efficient and timely manner than possible utilizing previous mechanisms that utilize polling.

In order to enable the functionality disclosed briefly above, an application developer registers with an application store to receive asynchronous push notifications for application store events of interest, such as events relating to in-application purchases, payment events, fulfillment events, application publishing events, and/or other types of events. In-application purchase events might include subscription state change events, such as the in-application purchase of a new subscription or the cancellation of a subscription to particular content. A subscription may be made to any type of content that carries an entitlement, is bound by a period of time, and may auto-renew at the end of the period. In-application purchase events might also indicate the purchase of "consumable" content or an "entitlement." Consumable content is content that is used within an application, such as perishable items like extra lives in a game or in-application currency. Entitled content (an "entitlement") is content that requires access rights to access, such as a purchased copy of an electronic magazine issue or the unlocking of a level in a game.

Application store payment events may include events detected by an application store, or associated systems, indicating the failure of a customer's payment instrument, the updating of a customer's payment instrument, the completion of a payment or refund, or other payment events. Asynchronous push notifications might also be provided for other types of application store payment events. Fulfillment events relate to the fulfillment of an application or in-application purchases to a customer device. For example, and without limitation, fulfillment events may be triggered when fulfillment of a purchased item has been completed to a customer's device or if fulfillment cannot be completed.

Application publishing events relate to events detected during an application submission and approval process. For example, an application publishing state change event might be generated when a new application submitted for inclusion in an application store has been approved. Similarly, an application publishing state change event might be generated when a new application submitted for inclusion in an application store has been denied. Notifications might also be generated and provided for other types of events of interest occurring within an application store and/or in conjunction with the sale and fulfillment of applications through an application store.

When an event for which a notification is to be provided is detected, an application store event message is generated for the event and provided to a notification service in one configuration. The notification service generates an application store event notification for the event on a topic defined for the event in advance by the application developer. The application store event notification may then be delivered to an endpoint defined by the application developer, such as a hypertext transfer protocol ("HTTP") endpoint exposed by a computing system operated by the application developer. Alternately, the application store event notification may be placed on a queue defined by the third-party application developer that is provided by a queue service. The notification service and/or the queue service are executed in a service provider network in some configurations. Other configurations might also be utilized.

A computing system operated by the third-party developer may receive the application store event notifications generated in the manner described above. Various types of actions may then be performed in an automated fashion based upon the content of the notifications. For example, and without limitation, if an application store event notification indicates that an application submitted by a developer for inclusion in an application store was denied, the application developer might modify the application and resubmit the application to the application store for approval. If an application store event notification indicates that a customer has completed an in-application purchase of a subscription, an entitlement, or a consumable, the purchased content may be provisioned to the customer's computing device. Other actions might be similarly performed in response to receiving other types of application store event notifications. Additional details regarding the various components and processes described briefly above for providing asynchronous application store event notifications will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for providing asynchronous application store event notifications. As shown in FIG. 1, various computing systems 103 may be operated in a distributed network, such as service provider network 102, to provide an application store 108. An application store 108 is an electronic marketplace where customers can browse and purchase application programs, such as an application 112, for download and use on their own customer devices, such as the customer device 122. An application store 108 might offer applications for use on customer devices 122 such as smart phones, tablet computers, laptop or desktop computers, and/or other types of computing devices.

In order to provide the application store 108 and, potentially, the other functionality disclosed herein, the application store computing systems 103 might include one or more application servers. The application servers may execute a number of software components in order to provide the application store services described herein, including the generation of application store event messages 136 describing events of interest taking place in conjunction with the provision of the application store 108. The software components may execute on a single application server or in parallel across multiple application servers. In addition, each software component may consist of a number of subcomponents executing on different application servers or other virtual or physical computing resources. Various components may be implemented as software, hardware, or any combination of the two.

It should be appreciated that the application store computing systems 103 shown in FIG. 1 have been simplified for discussion purposes and that many additional software and hardware components may be utilized. In particular, the application store computing systems 103 might interoperate with many other computing systems in order to provide the application store 108. For example, the application store computing systems 103 might utilize a subscription management service 128 to manage subscriptions to content provided as in-application purchases. Other systems and/or services not shown in FIG. 1, such as billing systems, reporting systems, customer relationship management systems, and others might also be utilized.

A customer 120 of the application store 108 may use a customer device 122 to access the application store 108 through a network (not shown in FIG. 1), such as the Internet. A customer 120 may be an individual or entity that desires to browse, purchase, or has purchased, one or more applications from the application store 108. The customer device 122 may be a smartphone, personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to a data communications network and communicating with the application store 108.

In some configurations, software components executing on the application store computing systems 103 provide functionality for permitting customers to browse and purchase applications 112 available from the application store 108. For instance, the application store 108 may receive a browse request from a customer device 122 and, in response thereto, retrieve information regarding a particular application 112 offered for sale from the application store 108 referenced by the browse request, generate or retrieve information describing the application, and transmit the information over a network to a client application (not shown in FIG. 1) executing on the customer device 122 for display to the customer 120. The application information may include a name of the application 112, the name of the application developer 110 that developed the application, a text description of the application 112, one or more images of the application 112 during execution, a price for the application 112, and/or other information. The application information might be stored in an suitable database or other type of data store maintained by the application store 108 for each application 112 offered for sale.

The network utilized to connect to the application store 108 might be a local-area network ("LAN"), a wide-area network ("WAN"), the Internet, or any other networking topology known in the art that connects a customer device 122 to the application store 108. A customer 120 may use a client application (not shown in FIG. 1) executing on the customer device 122 to access and utilize the functionality provided by the application store 108. The client application might be a Web browser or a stand-alone client application configured for communicating with the application store 108. The client application might also utilize any number of communication methods known in the art to communicate with the application store 108 across a network, including remote procedure calls, network service calls, remote file access, proprietary client-server architectures, and the like.

The application store 108 might also provide functionality for allowing an application developer 110 to submit an application 112 for inclusion in the application store 108. For example, and without limitation, the application store 108 may be configured to provide an application store developer portal 116 in some configurations. The application store developer portal 116 provides a Web-based interface through which an application developer 110 can create a new developer account in the application store 108, submit an application 112 for inclusion in the application store 108, and define application metadata 118 for the application 112, such as a description of the application 112, the price for the application, if any, and other information pertinent to the application 112.

The application metadata 118 can also include data defining in-application purchase items 126, such as available in-application purchase items for an application 112, purchase term, price, etc. An in-application purchase item 126 is an item that can a customer 120 can purchase from within an application 112. As discussed above, in-application purchase items 126 can include, but are not limited to, subscriptions, consumables, and entitlements. As also discussed briefly above, an in-application subscription may be made to any type of content that carries an entitlement, is bound by a period of time, and may auto-renew at the end of the period. A consumable in-application purchase is content that is used within an application, such as perishable items like extra lives in a game or in-application currency. An entitlement is content that requires access rights to access, such as a purchased copy of an electronic magazine issue or the unlocking of a level in a game. It should be appreciated that these examples are merely illustrative and that an application developer might define metadata 118 for other types of in-application purchase items 126 in other configurations.

Once an application developer 110 has submitted an application 112 and associated application metadata 118 to the application store 108, the operator of the application store 108 might perform a process for approving the application 112 for inclusion in the application store 108. For example, various types of automated tests might be performed on the application. If the operator of the application store 108 approves the application 112 for inclusion in the application store 108, the application 108 will then be made available to customers 120. If the operator of the application store 108 does not approve the application 112 for inclusion in the application store 108, a notification might be transmitted to the application developer 110 indicating that the application 112 was denied and providing a reason for the denial. One mechanism for providing such a notification to the application developer 110 is discussed below.

As also discussed briefly above, it has previously been necessary for computing systems operated by third-party application developers 110 to poll an application store 108 in order to obtain certain types of information from the application store 108. For example, in order to verify the validity of purchase receipts for in-application purchase items 126 made by application store 108 customers 120, it is commonly necessary for computing systems operated by third-party developers, such as the application developer system 114, to poll a receipt verification service (not shown in FIG. 1) or another type of service provided by the application store 108.

Polling application store systems in this manner, however, can result in delayed delivery of relevant data to third-party developers. Polling of application store systems might also be performed unnecessarily in cases where updated data has not been generated since the last time the application store systems were polled. Utilizing an implementation of the technologies described herein, asynchronous push notifications of the occurrence of events associated with the application store 108 can be provided to third-party developer computing systems, such as the application developer system 114, in real or near-real time and without polling of the application store 108. In this way, push notifications describing events of interest occurring at the application store 108 can be provided to an application developer 110 in a more efficient and timely manner than possible utilizing previous mechanisms that utilize polling. Additional details regarding these technologies will be provided below.

In order to provide the notifications described briefly above, the application store computing systems 103 may be configured to interoperate with several other services. In particular, in one configuration the application store computing systems 103 are configured to operate in conjunction with a notification service 104, which is provided by the service provider network 102 in one particular configuration.

The service provider network 102 is a distributed network system that is configured to provide virtual and/or physical computing resources, data storage, and/or other types of software services on a permanent or on-demand basis. Additional details regarding the configuration and operation of the service provider network 102 are provided below with regard to FIGS. 5-8. In this regard, it should be appreciated that while the application store 108 is also shown in FIG. 1 as being provided by computing systems 103 in the service provider network 102, the application store 108 might be provided by other systems external to the service provider network 102. Other configurations might also be utilized wherein the various services described herein are not provided by a service provider network 102. Other configurations will become apparent to those skilled in the art.

The notification service 104 may be implemented by a collection of computing resources collectively configured to provide a web service or other interface and an associated browser-based management console, such as the service provider network management console 130. The management console 130 can be used to configure topics 132 at the notification service 104 for which customers seek to receive notifications, configure applications (or people), subscribe clients to the topics, publish messages, or configure delivery of the messages over clients' protocol of choice (i.e., HTTP), e-mail and short message service ("SMS"), among others. The notification service 104 might also provide notifications to clients using a "push" mechanism without the need to periodically check or "poll" for new information and updates.

In order to enable the functionality disclosed briefly above, an application developer 110 may register with the application store 108 and/or configure the service provider network management console 130 to receive asynchronous push notifications for application store 108 events of interest, such as events relating to in-application purchases, payment events, fulfillment events, application publishing events, application store customer support events, and/or other types of events. In-application purchase events might include subscription state change events, such as the in-application purchase of a new subscription or the cancellation of a subscription to particular content. In-application purchase events might also include the purchase of a consumable, an entitlement or a physical good or service by a customer 120.

Application store 108 payment events may include events detected by the application store 108, or associated systems, indicating the failure of a customer's payment instrument, cancellation of a payment as a result of a risk or fraud check, the updating of a customer's payment instrument, the completion of a payment or refund, or other payment events. Asynchronous push notifications might also be provided for other types of application store 108 payment events. Fulfillment events relate to the fulfillment of an application 108 or in-application purchase items 126 to a customer device 122. For example, and without limitation, fulfillment events may be triggered when fulfillment of a purchased item 126 has been completed to a customer device 122 or if fulfillment cannot be completed.

Application publishing events relate to events detected during the application submission and approval process described above. For example, an application publishing state change event might be generated when a new application 108 submitted by an application developer 110 for inclusion in the application store 108 has been approved. Similarly, an application publishing state change event might be generated when a new application 112 submitted for inclusion in the application store 108 has been denied.

Application store customer support events relate to events generated in response to customer support issues or occurrences. For example, and without limitation, if a threshold number of customer complaints are received about an application or an in-application purchase, a notification might be generated to the developer of the application. The notification might provide detailed information regarding the customer support event or might direct the application developer 110 to the application store developer portal for further information. Notifications might also be generated and provided for other types of events of interest occurring within the application store 108 and/or in conjunction with the sale and fulfillment of applications 112 through the application store 108.

As a part of the configuration process described above, an application developer 110 may define a topic 132 in the notification service 104 for receiving application store event messages 136 generated by the application store 108. A topic 132 might correspond to an individual application 112, to a developer's account, or to another aspect of the operation of the application store 108 for which the application developer 110 desires to receive notifications.

The application developer 110 might also specify the manner in which application store event notifications 138 are to be provided by the notification service 104. For example, and without limitation, the application developer 110 might specify an HTTP or other type of endpoint on the application developer system 114 to which the application store event notifications 138 are to be provided. As another example, the application developer 110 might configure the notifications 138 from a topic 132 to be delivered to a queue 134 provided by a queue service 106. In this example, the application developer system 114 may periodically dequeue the application store event notifications 138 from the queue 134. In some configurations, the application store 108 places application store event messages 136 directly on the queue 134 without utilization of the notification service 104. Other delivery mechanisms and configurations might also be utilized.

When the application store 108 detects the occurrence of an event for which a notification 138 is to be provided, the application store 108 generates an application store event message 136 describing the event. The application store 108 then provides the application store event message 136 to the notification service 104 in one configuration. The notification service 104 generates an application store event notification 138 for the event on the topic 132 defined by the application developer 110 for the event. The application store event notification 138 may then be delivered to an endpoint defined by the application developer, such as an HTTP endpoint exposed by the application developer system 114. In the example shown in FIG. 1, for instance, the application store event notification 138A is delivered to an HTTP endpoint exposed by the application developer system 114.

Alternately, and as discussed briefly above, the application store event notification 138 may be placed on a queue 134 defined by the application developer 110 that is provided by the queue service 106. In the other example shown in FIG. 1, for instance, an application store event notification 138B is placed on the queue 134. The application developer system 114 can then retrieve the application store event notification 138B from the queue 134.

In response to receiving an application store event notification 138, the application developer system 114 might initiate the performance of various types of actions based upon the content of the notification 138. For example, and without limitation, if an application store event notification 138 indicates that an application 112 submitted by the developer 110 for inclusion in the application store 108 was denied, the application developer 110 might be notified so that the application developer 110 can modify the application and resubmit the application to the application store for approval.

If an application store event notification 138 indicates that a customer 120 has completed an in-application purchase of a subscription, an entitlement, or a consumable, the in-application purchase item 126 may be provisioned to the customer's computing device 120 from the application developer system 114 or another computing system. Other actions might be similarly performed in response to receiving other types of application store event notifications 138. Additional details regarding this process are provided below with regard to FIGS. 2-5.

Figure 2:
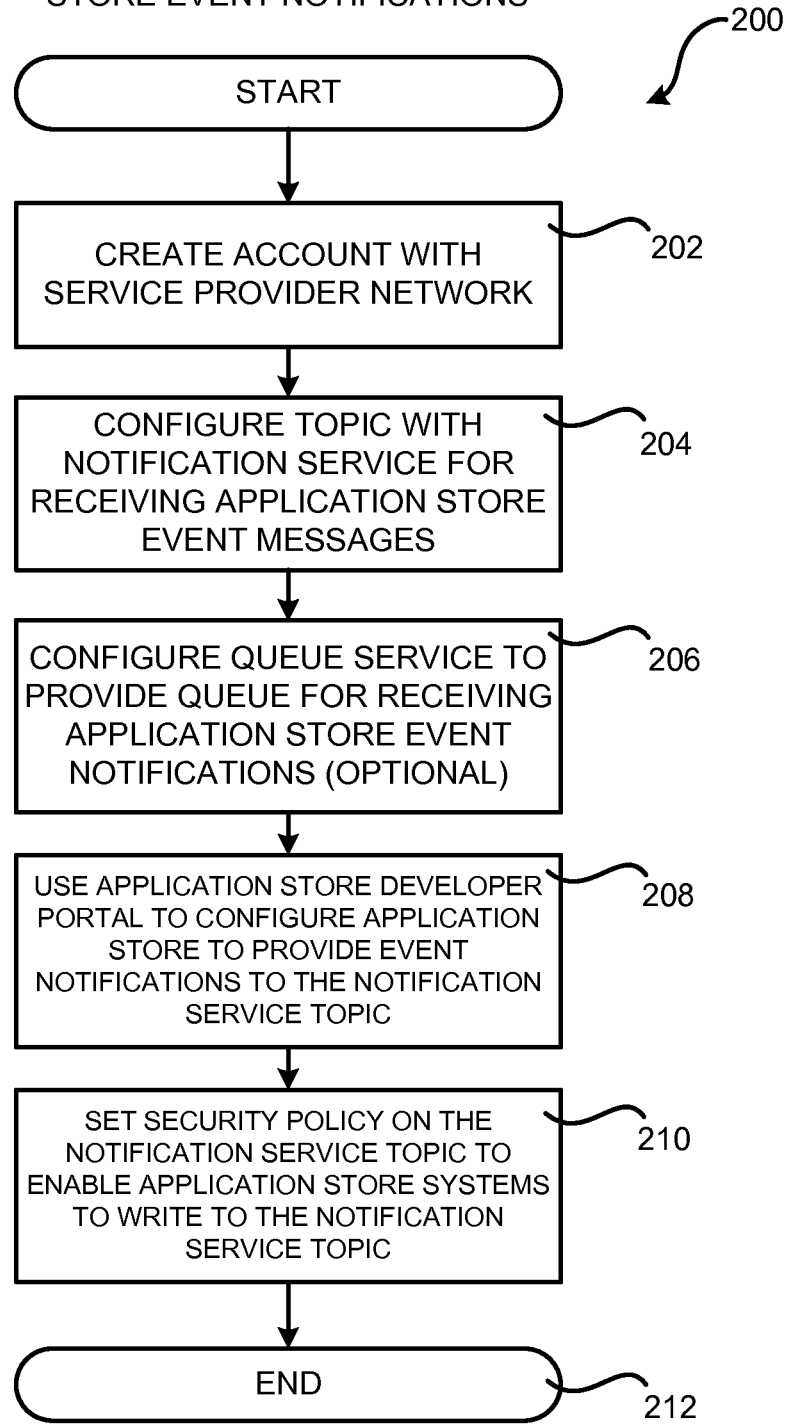
FIG. 2 is a flow diagram illustrating aspects of a routine disclosed herein for configuring services in a service provider network to provide asynchronous application store event notifications.

FIG. 2 is a flow diagram illustrating aspects of a routine 200 disclosed herein for configuring services executing in a service provider network 102, such as the notification service 104 and the queue service 106, to provide asynchronous application store event notifications 138 in the manner described above. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where an application developer 110 creates an account with the service provider network 102 in one particular configuration wherein the notification service 104 is implemented in the service provider network 102. As discussed above, the notification service 104 might be implemented in ways other than through the use of a service provider network 102 in other configurations. Once the application developer 110 has created an account with the service provider network at operation 202, the routine 200 proceeds to operation 204.

At operation 204, the application developer 110 configures a topic 132 with the notification service 104 for receiving application store event messages 136. For example, and without limitation, the application developer 110 might utilize the service provider network management console 130 to define the topic 132 for receiving the notifications 138. From operation 204, the routine 200 proceeds to operation 206.

As discussed above, the notification service 104 may be configured to deliver application store event notifications 138 directly to an HTTP endpoint exposed by the application developer system 114. Alternately, the notification service 104 might be configured to deliver notifications 138 to a queue 134 exposed by a queue service 106. In order to enable this configuration, the application developer 110 might configure the queue service 106 at operation 206 to provide a queue 134 for receiving the notifications 138 from the topic 132 defined at operation 204. As discussed above, the application developer system 114 might also be configured to retrieve the notifications 138 from the queue 134. In one configuration, the service provider network management console 130 can be utilized to configure the queue service 106.

From operation 206, the routine 200 proceeds to operation 208, where the application developer 110 might also utilize the application store developer portal 116 to configure the application store 108 to provide application store event messages 136 for specified event types to the topic 132 created in the notification service at operation 204. In one configuration, the application developer 110 may register to receive asynchronous push notifications 138 for events relating to in-application purchases, payment events, fulfillment events, application publishing events, and/or other types of events. Notifications might also be provided for other types of application store events.

In order to enable the application store computing systems 103 to place messages 136 on the topic 132, the application developer 110 might also set an appropriate security policy on the topic 132 at operation 210 to enable the application store computing systems 103 to write to the topic 132. The service provider network management console 130 or another component might be utilized to set the security policy on the topic 132 in various configurations. From operation 210, the routine 200 proceeds to operation 212, where it ends.

Figure 3:
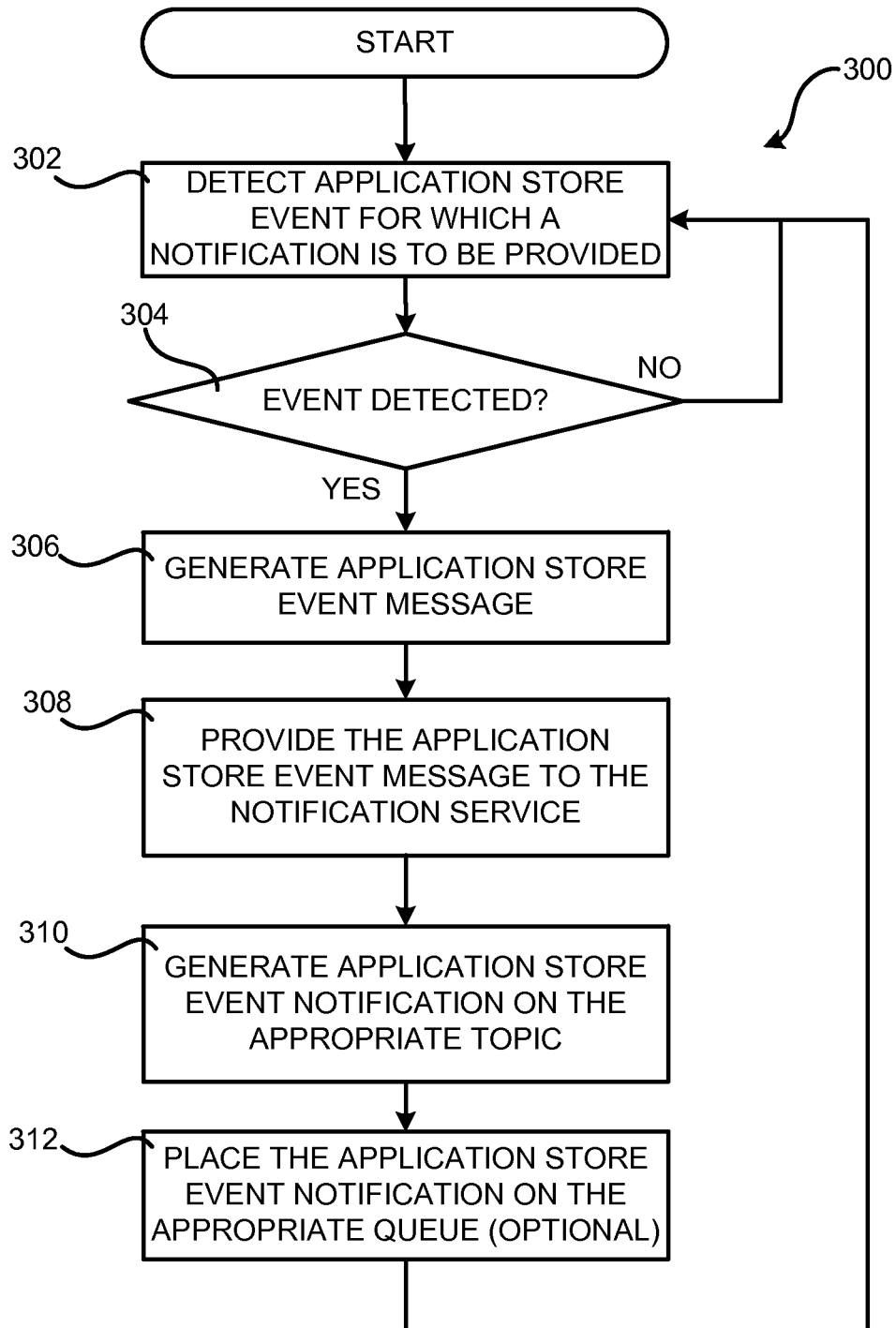
FIG. 3 is a flow diagram illustrating aspects of an illustrative routine disclosed herein for providing asynchronous notifications for application store events.

FIG. 3 is a flow diagram that illustrates aspects of an illustrative routine 300 disclosed herein for providing asynchronous application store event notifications 138 for application store events. The routine 300 begins at operation 302, where the application store 108 detects events for which notifications are to be provided. As discussed briefly above, an application developer 110 might utilize the application store developer portal 116 to define those events for which a notification is to be provided and to assign a topic 132 to the particular event types.

If an application store event is detected for which a notification is to be provided is detected, the routine 300 proceeds from operation 304 to operation 306. At operation 306, the application store 108 generates an application store event message 136 for the detected event. The application store event message 136 might include various types of information describing the event, such as an event identifier, a time and date at which the event occurred, and/or other data describing the event that may be relevant to the application developer 110. Once the application store event message 136 has been generated, the application store 108 provides the generated message 136 to the notification service 104 for placement on the appropriate topic 132.

In response to receiving an application store event message 136, the notification service 104 generates an application store event notification 138 for the detected event. In some configurations, this may include transmitting an application store event notification 138 to an HTTP endpoint defined by an application developer 110. Other types of endpoints might also be utilized in other configurations.

As also discussed above, the notification service 104 might be configured to place notifications 138 on a queue 134 defined by the application developer 110 and provided by the queue service 106. In this configuration, the notification service 104 places the notification 138 on the appropriate queue 134 at operation 312. The routine 300 then proceeds back to operation 302, where additional events may be detected and additional notifications 138 may be provided in the manner described above.

Figure 4:
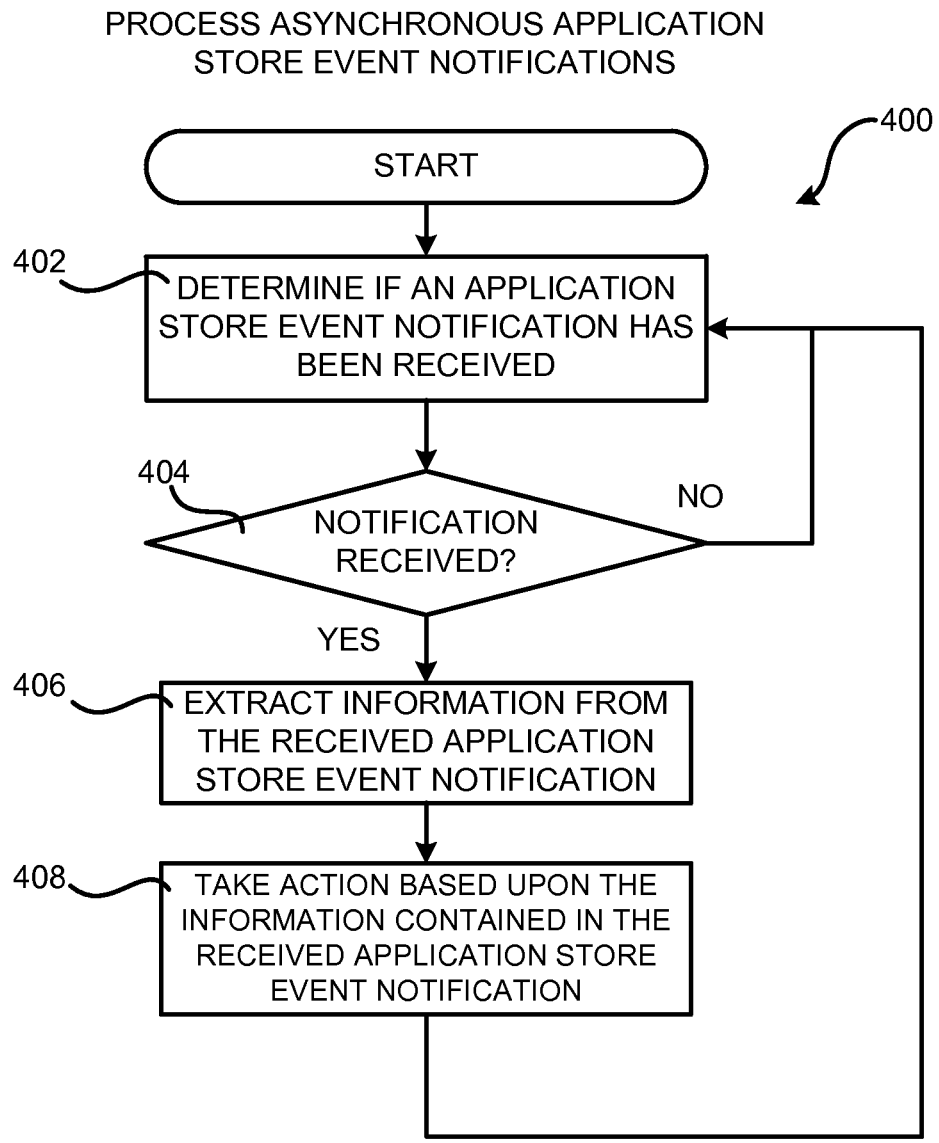
FIG. 4 is a flow diagram illustrating aspects of a routine disclosed herein for receiving and processing asynchronous notifications generated for application store events.

FIG. 4 is a flow diagram illustrating aspects of a routine 400 disclosed herein for receiving and processing asynchronous application store event notifications 138 generated for application store events. The routine 400 begins at operation 402, where the application developer system 114 determines whether an application store event notification 138 has been received. For example, and as discussed above, the application developer system 114 might receive a notification 138 by way of an HTTP endpoint, by way of another type of endpoint, or might obtain a notification 138 from a queue 134.

If an application store event notification 138 has been received, the routine 400 proceeds from operation 404 to operation 406, where the application developer system 114 extracts the data contained in the received application store event notification 138. For example, and without limitation, the application developer system 114 might extract information indicating the type of event that occurred, the date/time of the event, information identifying a customer 120 that the event pertained to, information identifying the application 112 relating to the event, an identifier for an in-application purchase item 126, and/or other information. Some or all of this information might be encrypted and/or otherwise obfuscated.

The routine 400 then proceeds to operation 408, where the application developer system 114 may initiate various types of actions depending on the type of event that was detected. For example, if an application store event notification 138 indicates that an application 112 submitted by the developer 110 for inclusion in the application store 108 was denied, the application developer system 114 might provide a notification to the application developer 110 so that the application developer 110 can modify the application and resubmit the application to the application store for approval.

If an application store event notification 138 indicates that a customer 120 has completed an in-application purchase of a subscription, an entitlement, or a consumable, the in-application purchase item 126 may be provisioned to the customer's computing device 120 from the application developer system 114 or another computing system. If an application store event notification 138 indicates that a customer's payment instrument has failed, steps might be taken to prompt the customer to retry their purchase attempt using a new payment instrument. Other actions such as, but not limited to, auditing and reporting might be similarly performed in response to receiving other types of application store event notifications 138. From operation 408, the routine 400 proceeds back to operation 402, where additional application store event notifications 138 may be processed in the manner described above.

Figure 5:
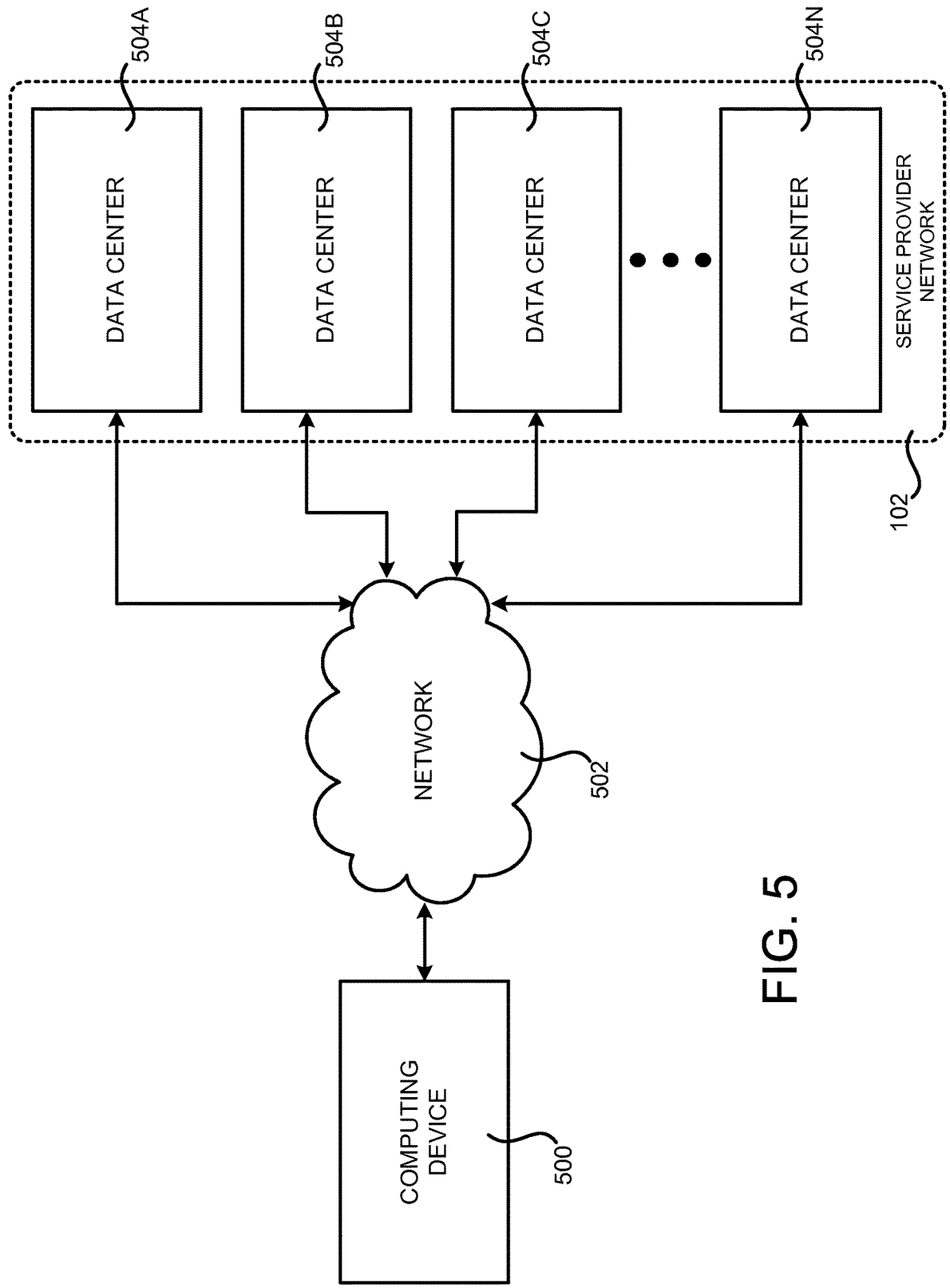
FIG. 5 is a system and network diagram that shows an illustrative operating environment that includes a service provider network that may be configured to implement aspects of the functionality described herein.

FIG. 5 is a system and network diagram that shows one illustrative operating environment for the configurations disclosed herein that includes a service provider network 102 that may be configured to provide asynchronous application store event notifications 138 in the manner described above, according to one configuration disclosed herein. As discussed above, the service provider network 102 can provide computing resources on a permanent or an as-needed basis. Among other types of functionality, the computing resources provided by the service provider network 102 can be utilized to execute the various services described above. The computing resources provided by the service provider network 102 may include various types of computing resources, such as data processing resources, data storage resources, networking resources, data communication resources, network services, and the like.

Each type of computing resource provided by the service provider network 102 may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and/or other types of programs. Data storage resources may include file storage devices, block storage devices, and the like. The service provider network 102 might also be configured to provide other types of resources and network services.

The computing resources provided by the service provider network 102 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for providing asynchronous application store event notifications 138 will be described below with regard to FIG. 6.

The customers and other users of the service provider network 102 may access the computing resources provided by the service provider network 102 over a network 502, which may be a wide area communication network ("WAN"), such as the Internet, an intranet or an Internet service provider ("ISP") network or a combination of such networks. For example, and without limitation, a computing device 500 operated by a customer or other user of the service provider network 102 might be utilized to access the service provider network 102 by way of the network 502. It should be appreciated that a local-area network ("LAN"), the Internet, or any other networking topology known in the art that connects the data centers 504 to remote customers and other users may be utilized. It should also be appreciated that combinations of such networks might also be utilized.

Figure 6:
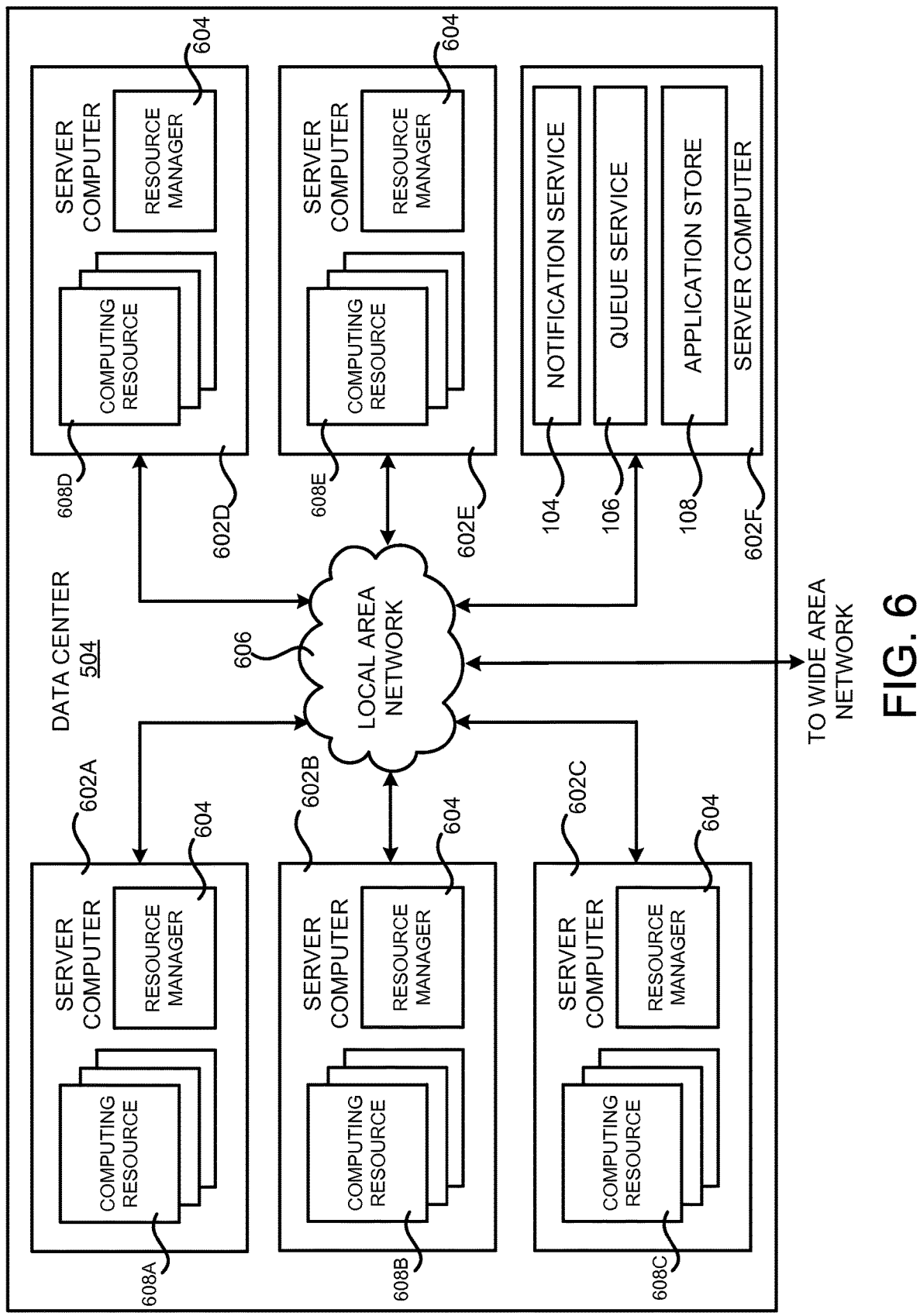
FIG. 6 is a computing system diagram that illustrates a configuration for a data center that may be utilized to implement aspects of the technologies disclosed herein.

FIG. 6 is a computing system diagram that illustrates one configuration for a data center 504 that implements aspects of the concepts and technologies disclosed herein for providing asynchronous application store event notifications 138 The example data center 504 shown in FIG. 6 includes several server computers 602A-602F (which may be referred to herein singularly as "a server computer 602" or in the plural as "the server computers 602") for providing computing resources 608A-608E.

The server computers 602 may be standard tower, rack-mount, or blade server computers configured appropriately for providing the computing resources described herein. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources. In the case of virtual machine instances, for example, the resource manager 604 might be a hypervisor or another type of program configured to enable the execution of multiple virtual machine instances on a single server 602. Server computers 602 in the data center 504 might also be configured to provide network services and other types of services, some of which are described in detail below with regard to FIG. 7.

Figure 7:
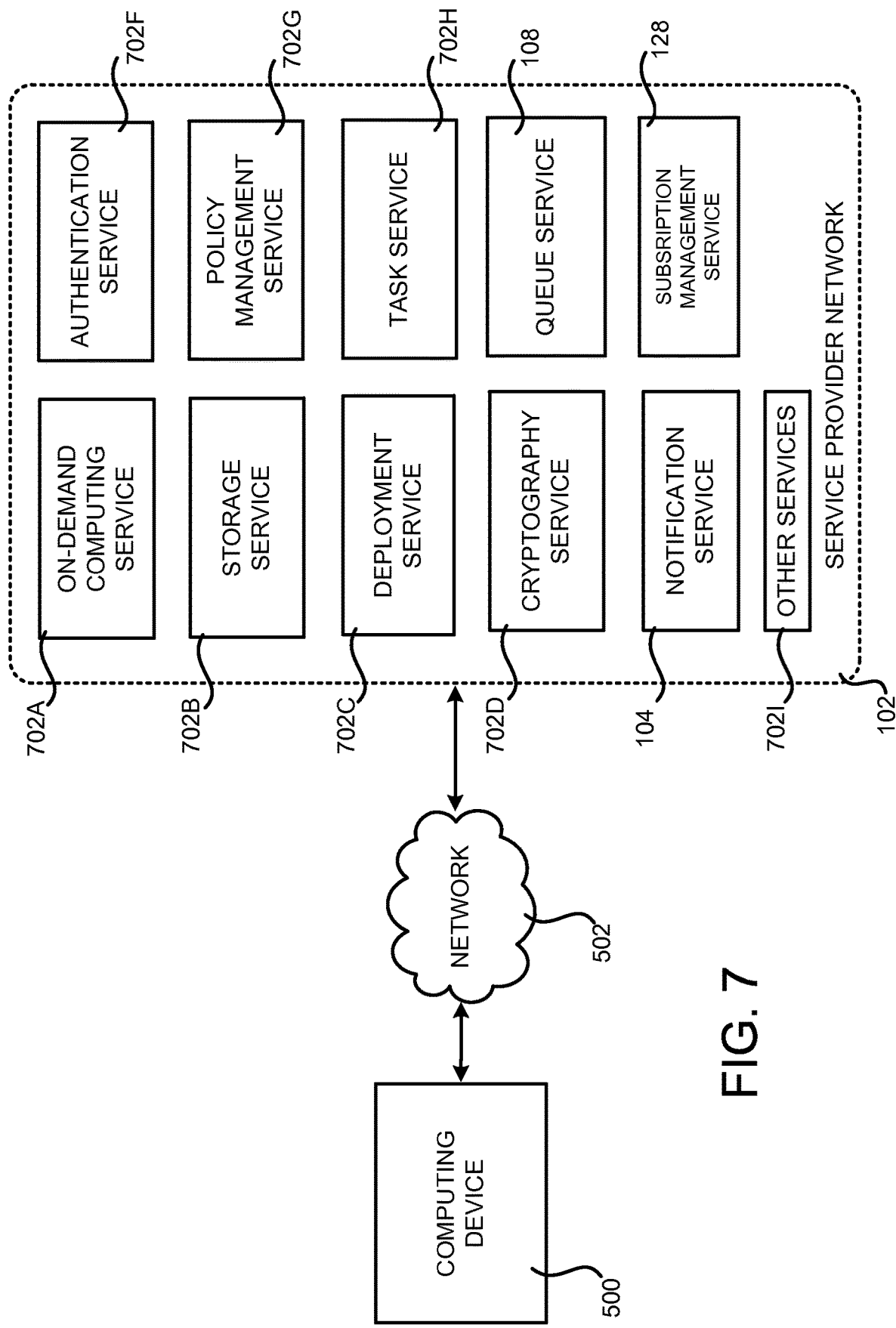
FIG. 7 is a system and network diagram that shows aspects of several services that might be provided by and utilized within a service provider network in one configuration disclosed herein.

The data center 504 shown in FIG. 7 also includes a server computer 602F that may execute some or all of the software components described above. For example, and without limitation, the server computer 602F might be configured to execute the one or more of the notification service 104, the queue service 106, and/or software components for providing the application store 108, each of which has been described in detail above. The server computer 602F might also be configured to execute other components and/or to store data for providing some or all of the functionality described herein. In this regard, it should be appreciated that the services illustrated in FIG. 6 as executing on the server computer 602F might execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 502 illustrated in FIG. 6. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations might be utilized.

FIG. 7 is a system and network diagram that shows aspects of several network services that might be provided by and utilized within a service provider network 102 in one configuration disclosed herein. In particular, and as discussed briefly above, the service provider network 102 may provide a variety of network services to customers and other users of the service provider network 102 including, but not limited to, an on-demand computing service 702A, a storage service 702B, a deployment service 702C, a cryptography service 702D, an authentication service 702F, a policy management service 702G, and/or a task service 702H, each of which is described in greater detail below. Additionally, the service provider network 102 might also provide the notification service 104, the queue service 108, and the subscription management service 128, each of which was described in detail above. The service provider network 102 might also provide other services 702I, some of which are described in greater detail below.

It should be appreciated that customers of the service provider network 102 may include organizations or individuals that utilize some or all of the services provided by the service provider network 102. As shown in FIG. 7, a customer or other user may communicate with the service provider network 102 through the network 502. Communications from the computing device 500 to the service provider network 102 may cause the services provided by the service provider network 102 to operate in accordance with the described configurations or variations thereof.

It is noted that not all configurations described include the services described with reference to FIG. 7 and that additional services may be provided in addition to or as an alternative to services explicitly described. Each of the services shown in FIG. 7 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 702A to store data in or retrieve data from the data storage service 702B). Additional details regarding some of the services shown in FIG. 7 will now be provided.

The on-demand computing service 702A may be a collection of computing resources configured to instantiate virtual machine instances. For example, a customer or other user of the service provider network 702A may interact with the on-demand computing service 702A (via appropriately configured and authenticated API calls) to provision and operate virtual computer systems that are instantiated on physical computing devices hosted and operated by the service provider network 102. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the on-demand computing service 702A is shown in FIG. 7, any other computer system or computer system service may be utilized in the service provider network 102, such as a computer system or computer system service that does not employ virtualization and instead provisions computing resources on dedicated or shared computers/servers and/or other physical devices.

In some configurations, the on-demand computing service 702A is configured to provide clusters of computing resources. For example, and without limitation, the on-demand computing service 702A might provide clusters of virtual or physical hosts for executing services such as those described above. According to one configuration, computing clusters provided by the on-demand computing service 702A might be organized as an APACHE™ HADOOP® computing cluster specialized for deployment alongside, or within, the service provider network 102. It should be appreciated that other variations and implementations of computing clusters are possible. Thus, the present disclosure should not be limited to only these examples, but should be interpreted as including any equivalent variations as well.

The storage service 702B might include software and computing resources that collectively operate to store data using block or file-level storage devices (and/or virtualizations thereof). The storage devices of the storage service 702B might, for instance, be operationally attached to virtual computer systems provided by the on-demand computing service 702A to serve as logical units (e.g., virtual drives) for the computer systems. A storage device might also enable the persistent storage of data used/generated by a corresponding virtual computer system where the virtual computer system service might only provide ephemeral data storage.

The service provider network 102 may also include a cryptography service 702D. The cryptography service 702D may utilize storage services of the service provider network 102, such as the storage service 702B, to store encryption keys in encrypted form, whereby the keys may be usable to decrypt customer keys accessible only to particular devices of the cryptography service 702D. The cryptography service 702D might also provide other types of functionality not specifically mentioned herein.

As discussed above, the service provider network 102 might also provide the notification service 104 in some configurations. As discussed above, the notification service 104 may comprise a collection of computing resources collectively configured to provide a web service or other interface and an associated browser-based management console, such as the service provider network management console 130. The management console 130 can be used to configure topics 132 for which customers seek to receive notifications, configure applications (or people), subscribe clients to the topics, publish messages, or configure delivery of the messages over clients' protocol of choice (i.e., HTTP), e-mail and short message service ("SMS"), other types of push mechanisms, including mechanisms for pushing notifications to mobile devices, and others. The notification service 104 might also provide notifications to clients using a "push" mechanism without the need to periodically check or "poll" for new information and updates. The notification service 104 may further be used for various purposes such as monitoring applications executing in the on-demand computing service 702A, workflow systems, time-sensitive information updates, mobile applications, and many others.

As illustrated in FIG. 7, the service provider network 102, in various configurations, also includes an authentication service 702F and a policy management service 702G. The authentication service 702F, in one example, is a computer system (i.e., collection of computing resources) configured to perform operations involved in authentication of users. For instance, one of the services 702 shown in FIG. 7 may provide information from a user to the authentication service 702F to receive information in return that indicates whether or not the requests submitted by the user are authentic.

The policy management service 702G, in one example, is a network service configured to manage policies on behalf of customers or internal users of the service provider network 102. The policy management service 702G may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 102, in various configurations, is also configured with a task service 702H. The task service 702H is configured to receive a task package and to enable executing tasks as dictated by the task package. The task service 702H may be configured to use any resource of the service provider network 102, such as instantiated virtual machines or virtual hosts, for executing the task. The task service 702H may configure the instantiated virtual machines or virtual hosts to operate using a selected operating system and/or a selected execution application in accordance with specified requirements.

The service provider network 102 might also maintain the queue service 106. As discussed above, the queue service 106 provides functionality for allowing customers to define one or more queues 134. The queues 134 may then be subscribed to a topic 132 in order to receive notifications 138 generated by the topic. A customer computing device, such as the application developer system 114, can be configured to periodically dequeue the notifications 138 from the queue 134. In this way, notifications 138 can be consumed in a manner that is not likely to drop any notifications 138. The queue service 106 might also provide other types of functionality not specifically mentioned herein.

The service provider network 102 may additionally maintain other services 702 based, at least in part, on the needs of its customers. For instance, the service provider network 102 may maintain a deployment service 702C for deploying program code and/or a database service (not shown in FIG. 7) in some configurations. A database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. Other services include object-level archival data storage services, and services that manage, monitor, interact with, or support other services. For example, subscription management service 128 might be provided to assist the application store 108 with the management of in-application subscriptions to content. The service provider network 102 might also be configured with other services not specifically mentioned herein in other configurations.

Figure 8:
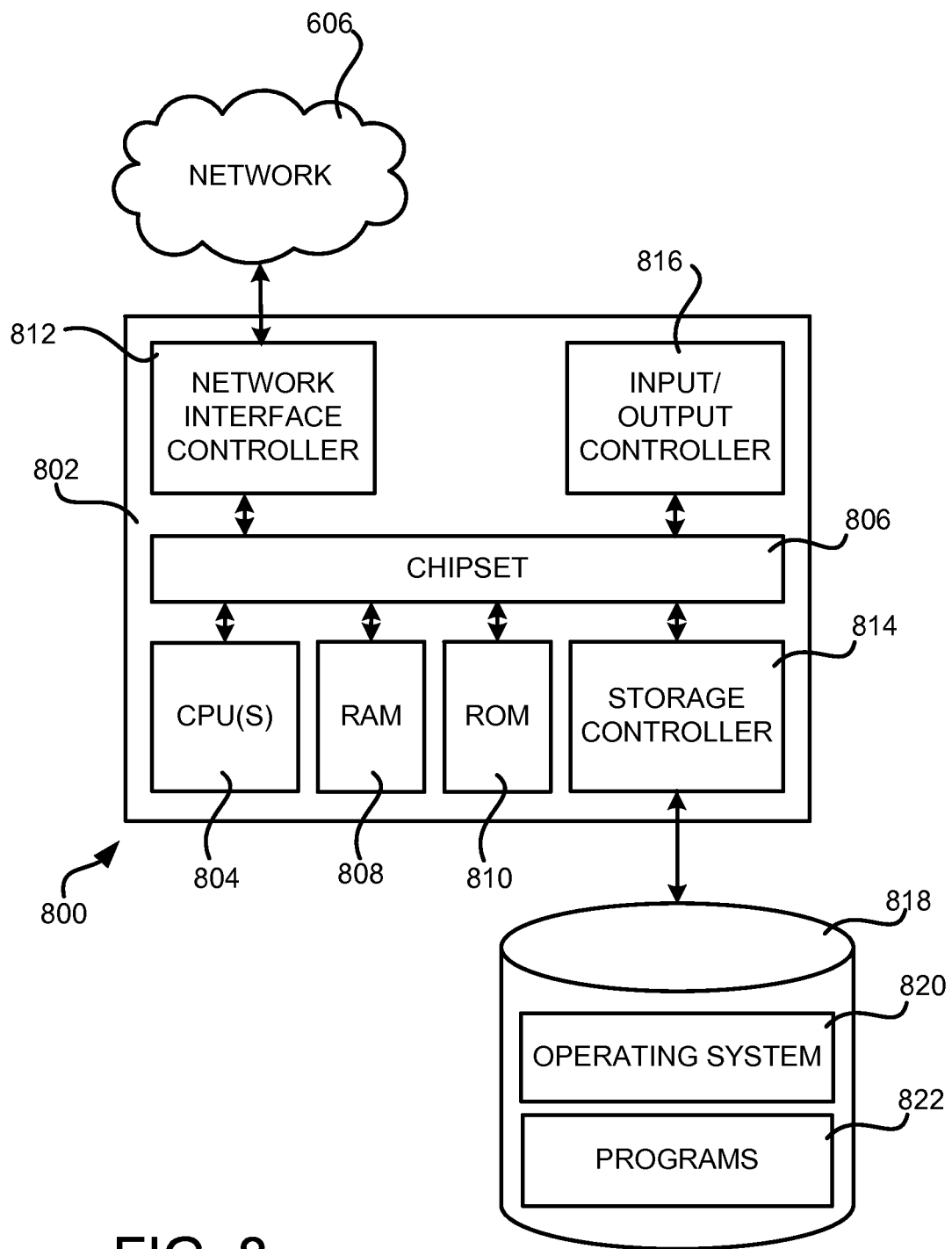
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components for implementing various aspects of the functionality described above. The computer architecture shown in FIG. 8 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the asynchronous application store event notifications 138 in the manner described above.

The computer 800 includes a baseboard 802, or "motherboard," which is a printed circuit board to which a multitude of components or devices may be connected by way of a system bus or other electrical communication paths. In one illustrative configuration, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the network 606. The chipset 806 may include functionality for providing network connectivity through a NIC 812, such as a gigabit Ethernet adapter. The NIC 812 is capable of connecting the computer 800 to other computing devices over the network 606. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store an operating system 820, programs 822, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 may store an operating system 820 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various processes described above with regard to FIGS. 1-4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, an input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing asynchronous notifications for application store events have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus for providing asynchronous notification of application store events, the apparatus comprising:
 a processor; and
 a non-transitory computer-readable storage medium having instructions stored thereupon which are executable by the processor and which, when executed, cause the apparatus to
  detect an application store event for which an asynchronous notification is to be provided,
  generate a message identifying the application store event in response to detecting the application store event,
  provide the message to a notification service executing in a service provider network, generate, by way of the notification service, a notification for the application store event on a topic defined for the application store event based on the message; and provide the notification to a queue provided by a queue service executing in the service provider network.

2. The apparatus of claim 1, wherein the non-transitory computer-readable storage medium has further instructions stored thereupon to push the notification to a hypertext transfer protocol (HTTP) endpoint.

3. The apparatus of claim 1, wherein the application store event comprises an event relating to an in-application purchase.

4. The apparatus of claim 1, wherein the application store event comprises a payment status event.

5. The apparatus of claim 1, wherein the application store event comprises a fulfillment status event.

6. The apparatus of claim 1, wherein the application store event comprises an application publishing state change event.

7. A non-transitory computer-readable storage medium having computer-executable instructions stored thereupon which, when executed by a computer, cause the computer to:

detect an application store event;

transmit a message describing the application store event to a notification service executing within a service provider network;

generate an asynchronous application store event notification for the application store event on a topic maintained by the notification service;

provide the application store event notification to one or more subscribers by way of the notification service; and provide the application store event notification to the one or more subscribers by way of a queue provided by a queue service executing in the service provider network.

8. The non-transitory computer-readable storage medium of claim 7, wherein the application store event notification is provided to at least one of the one or more subscribers by way of a hypertext transfer protocol (HTTP) endpoint.

9. The non-transitory computer-readable storage medium of claim 7, wherein the application store event comprises an event relating to an in-application purchase of an entitlement, a consumable, a subscription, or a physical good.

10. The non-transitory computer-readable storage medium of claim 7, wherein the application store event comprises a payment status event.

11. The non-transitory computer-readable storage medium of claim 7, wherein the application store event comprises a fulfillment status event.

12. The non-transitory computer-readable storage medium of claim 7, wherein the application store event comprises an application store customer support event.

13. A computer-implemented method for providing asynchronous notifications of application store events, comprising:

detecting an application store event;

generating an application store event notification for the application store event on a topic maintained by a notification service executing in a service provider network;

providing the application store event notification to one or more subscribers by way of the notification service; and providing the application store event notification to the one or more subscribers by way of a queue provided by a queue service executing in the service provider network.

14. The computer-implemented method of claim 13, wherein the application store event comprises an event relating to an in-application purchase of an entitlement, a consumable, a subscription, or a physical good.

15. The computer-implemented method of claim 13, wherein the application store event comprises a payment status event.

16. The computer-implemented method of claim 13, wherein the application store event comprises a fulfillment status event.

17. The computer-implemented method of claim 13, wherein the application store event comprises an application publishing state change event.

18. The computer-implemented method of claim 13, wherein the application store event comprises an application store customer support event.

* * * * *